July 9, 1968
G. W. BROWN
3,391,588
APPARATUS AND METHODS FOR REMOVING FLASH
FROM A PLASTIC CONTAINER
Filed Nov. 8, 1965
2 Sheets-Sheet 1
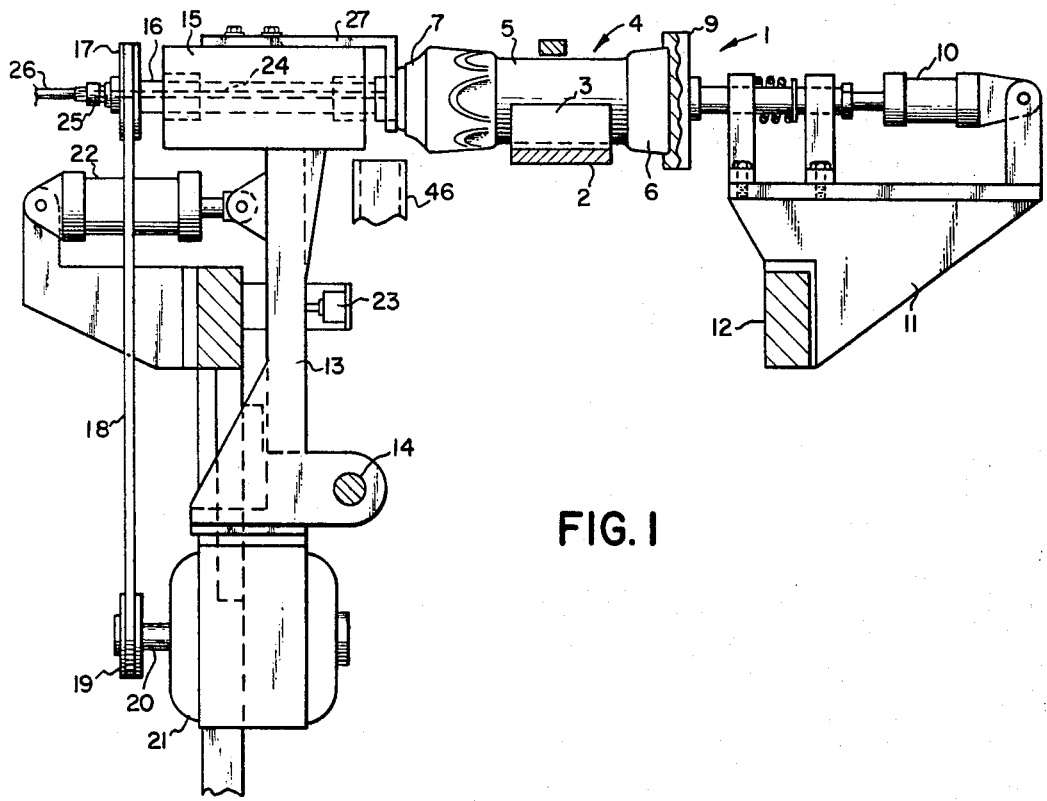
FIG. 1
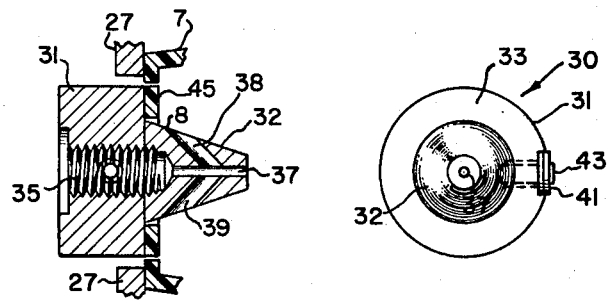
FIG. 6
FIG. 5
INVENTOR.
GAYLORD W. BROWN
BY
*Learman & McCulloch*
ATTORNEYS July 9, 1968  G. W. BROWN  3,391,588
APPARATUS AND METHODS FOR REMOVING FLASH
FROM A PLASTIC CONTAINER
Filed Nov. 8, 1965  2 Sheets-Sheet 2

INVENTOR.
GAYLORD W. BROWN
BY
ATTORNEYS

United States Patent Office 3,391,588
Patented July 9, 1968

3,391,588
APPARATUS AND METHODS FOR REMOVING
FLASH FROM A PLASTIC CONTAINER
Gaylord W. Brown, Beaverton, Mich., assignor to Brown
Machine Company of Michigan, Inc., Beaverton, Mich.,
a corporation of Michigan
Filed Nov. 8, 1965, Ser. No. 506,682
10 Claims. (Cl. 83—24)

ABSTRACT OF THE DISCLOSURE

An apparatus and method of trimming an opening in a container having a radial surface surrounding its mouth wherein a cutter is inserted through the material of the container adjacent the mouth and an opening is cut around the mouth to remove a ring, means being provided on the cutter to urge the material cut out axially outwardly of the container mouth trimmed.

---

This invention relates to apparatus and methods for trimming an opening formed in the mouth of a hollow, plastic container such as a jar or bottle, and more particularly the invention is concerned with the cutting away of flash material from the container in such manner as to provide a smooth edged opening and prevent any of the cut away material from entering the container.

In the molding of bottles and jars from plastic materials it is common for the edges of openings formed in such articles during the molding process to be somewhat ragged or uneven. One problem encountered with apparatus used to deflash the mouths of containers is the likelihood that some of the material removed from the container will enter the container from which it subsequently must be removed in order to avoid contamination of the contents of the container. Another problem is that the removal of material from the containers by some processes generates heat sufficient to melt the plastic material, thereby frequently resulting in irregularities or unevenness of the edges of the opening being trimmed.

An object of this invention is to provide trimming methods and apparatus which overcome the problems referred to above.

Another object of the invention trimming apparatus which is operable to enlarge an opening in a container by removing material from the container in a unitary piece, thereby eliminating the creation of minute particles which may find their way into the container.

A further object of the invention is to provide trimming apparatus of the character referred to and with which is incorporated fluid pressure means that is so oriented with respect to the material to be removed from the container that the removed material is continuously urged in a direction outwardly of the container.

Another object of the invention is to provide trimming apparatus of the character described and which is adapted for incorporation in existing automated machinery without necessitating any modification of such machinery.

Other objects and advantages of the invention will be pointed out specifically or will become apparent from the following description when it is considered in conjunction with the appended claims and the accompanying drawings, in which:

FIGURE 1 is a fragmentary view partly in side elevation and partly in section of apparatus constructed in accordance with the invention and in condition to trim an opening at the mouth of a container supported on a conveyor assembly;

FIGURE 5 is a front elevational view of the trimmer body; and

FIGURE 6 is a longitudinal sectional view through the trimmer body and the container end wall.

Figure 2:
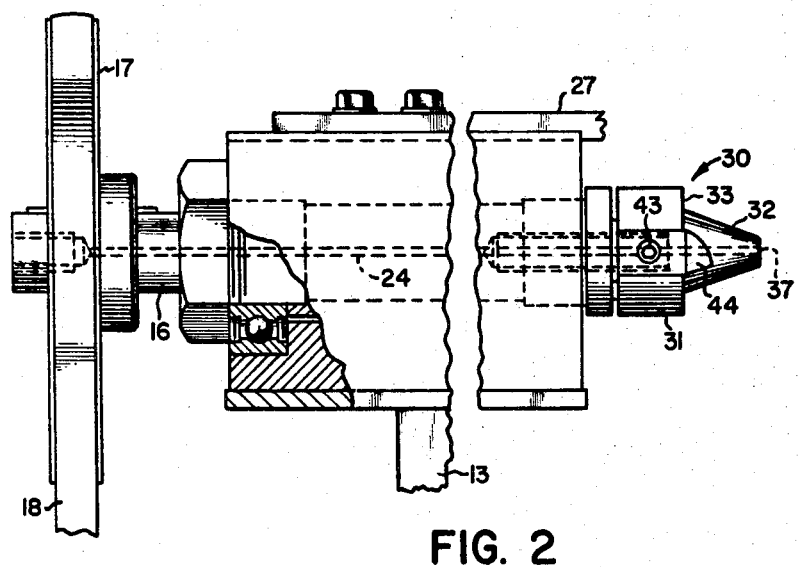
FIGURE 2 is an enlarged, fragmentary view of a portion of the apparatus shown in FIGURE 1.
Figures 3, 4:
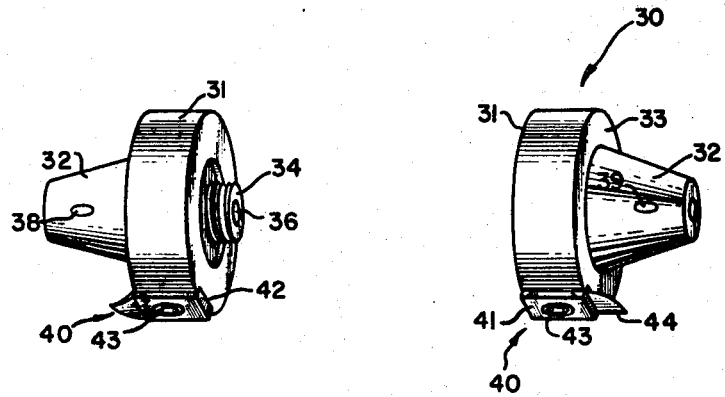
FIGURE 3 is a perspective view of a trimmer body constructed in accordance with the invention.
FIGURE 4 is a perspective view of the trimmer body, but rotated through 180°.

Apparatus constructed in accordance with the invention is adapted for incorporation in a conveyor assembly 1 of known construction such as that illustrated and described in co-pending application, Ser. No. 275,159, filed Apr. 23, 1963, and to which reference may be had for a more detailed disclosure. Briefly, however, the conveyor apparatus comprises a driven belt 2 on which is fixed generally U-shaped saddle members 3 by means of which containers 4 formed of plastic material such as polystyrene or polypropylene, for example, may be conveyed through various stations. The container disclosed in FIGURE 1 is a hollow bottle having a cylindrical side wall 5, a closed end wall 6 and an opposite end wall 7 that is closed except for an opening 8 (see FIGURE 6) which is formed during the molding process. The conveyor belt 2 moves the container 4 to a trimming station at which the closed end wall 6 is gripped by a clamp or support 9 which is reciprocable under the control of a pneumatic ram 10 that is mounted on a support 11 secured to a frame member 12.

At the trimming zone is a swingable arm 13 which is pivoted as at 14 to the machine frame and to the upper end of which is fixed a journal block 15 in which is rotatably journaled a spindle 16. Fixed to the spindle 16 is a pulley 17 around which is trained a drive belt 18 that also is trained around a pulley 19 fixed on the armature shaft 20 of an electric motor 21 that is supported from the bracket 13. The bracket 13 and its associated apparatus are oscillated toward and away from the container 4 by means of a pneumatic arm 22 under the control of a valve operator 23 in the manner described in the aforementioned copending application.

The spindle 16 is provided with a longitudinal bore 24 in which is accommodated a fitting 25 for the reception of one end of a tube 26, the other end of which is connected to a source (not shown) of compressed air. Suitable valve means (not shown) are associated with the tube 26 and operable under the control of the valve controller 23 to regulate the flow of air through the bore 24.

In the operation of the apparatus thus far described, a container will be delivered by the conveyor belt 2 to the trimming station whereupon movement of the conveyor 2 will be interrupted. The clamp member 9 will be advanced to engage the closed end of the container and the bracket 13 will be swung clockwise to the position shown in FIGURE 1 so as to position a clamp 27 carried by the block 15 against the end wall 7 of the container, whereupon the latter will be held securely in such position as to enable the opening 8 to be trimmed.

Trimming apparatus constructed in accordance with the disclosed embodiment of the invention comprises a body generally designated 30 terminating at one end in a generally cylindrical disc 31 and at its other end in a frusto-conical tip 32. The diameter of the larger end of the tip 32 is smaller than the diameter of the disc 31, and the tip 32 is concentric with the disc 31 so as to form an annular shoulder 33 at the juncture of the disc and the tip.

The body 30 is adapted to be fixed to and rotated with the spindle 16 and includes a threaded mounting member 34 which is threaded into a socket 35 formed in the disc 31 and which may be fitted into a similar socket provided in the spindle 16. The member 34 is axially bored as at 36 so as to form a fluid passage in communication with the bore 24 in the spindle. The tip 32 also is axially bored as at 37 to form a continuation of the fluid passage.

Formed in the tip 32 and in communication with the passage 37 is a pair of laterally directed ports 38 and 39 which emerge from opposite sides of the tip at a zone between the free end of the tip and the shoulder 33 along lines which diverge in a direction toward the shoulder. As is indicated in FIGURE 6, the cross-sectional area of each port 38 and 39 is greater than the cross-sectional area of the passage 37.

Cutting means 40 is carried by the body 30 and comprises at least one blade generally designated 41 accommodated in an axially extending recess 42 formed in the periphery of the disc 31 and retained therein by a set screw 43. The blade includes a sharpened cutting end 44 which extends axially alongside but radially spaced from the tip 32 and terminates substantially in the zone of emergence of the ports 38 and 39.

When a container is presented at the trimming station, the container is clamped between the members 9 and 27 by actuation of the rams 10 and 22. As the clamp member 27 engages the end wall 7 of the container, the tip 32 of the trimming body will be introduced into the opening 8 at the mouth of the body. As the tip 32 moves into the opening 8, the leading end of the cutter blade 44 will be plunged into the material of the end wall 7 whereupon rotation of the body 32 by the motor 21 will cause the cutter to cut around the opening 8, and cut from the wall 7 an annular ring 45 (see FIGURE 6). Preferably the cutter is rotated through a minimum number of revolutions, thereby preventing any appreciable heating of the plastic material. The newly formed edge of the opening at the mouth of the container therefore will be smooth and sharply defined.

Simultaneously with the rotation of the trimming body 32, air under pressure flows from the tube 26 through the spindle 16 into and through the passage 37. Some of the air introduced to the passage 37 will flow through the tip 32 into the interior of the container 4 so as to establish a relatively high pressure within the container and prevent the entry of plastic dust and chips into the container. Not all of the air introduced to the passage 37, however, is discharged from the forward end of the tip. Some of the air diverted to the ports 38 and 39 due to their greater cross-sectional area and the buildup of pressure inside the container and is discharged therefrom rearwardly toward the shoulder 33 so as to impinge upon the ring 45 being trimmed from the mouth of the container. The force of air issuing from the ports 38 and 39 should be such that the ring not only is prevented from entering the container 4, but is urged against the shoulder 33 of the body 32.

Following the trimming of the mouth opening of the container, the rams 10 and 22 are actuated so as to move the members 9 and 27 away from the container 4. After the member 27 has moved away from the container a distance sufficient to prevent the valve controller 23 to be released, the latter is actuated so as to discontinue the discharge of air through the cutter body, and further withdrawal of the member 13 and tip 32 causes the trim ring 45 to spin off the end of tip 32 to a scrap chute 46.

The disclosed apparatus and methods are representative of the presently preferred forms of the invention, but are intended to be illustrative rather than definitive thereof. The invention is defined in the claims.

What is claimed is:

1. A trimming tool comprising a rotatable body terminating at one end in a tip; cutting means carried by said body and extending toward said one end thereof; axially extending fluid passage means in said body; and laterally directed fluid port means in said tip in communication with said passage means and emerging from said tip in a direction toward the other end of said body; said port means comprising a pair of ports emerging from opposite sides of said tip along lines that diverge in a direction toward said one end of said body.

2. Apparatus for enlarging an opening in an article comprising means for holding said article; a rotatable body having a frusto-conical tip at one end and an enlarged shoulder at its other end; means for rotating said body about an axis; cutter means carried by said shoulder extending alongside but radially spaced from said tip and terminating at a zone between the ends of said tip; means for moving said body in a direction to introduce said tip into the opening of the article and to plunge said cutter means into said article adjacent said opening; means for rotating said body to enable said cutter means to cut an annular ring from said article and enlarge said opening; fluid passage means in said body adapted for connection to a source of pressure fluid; and fluid port means in communication with said passage means and emerging from said body in a direction to direct pressure fluid against said annular ring and urge the latter toward said shoulder.

3. The apparatus set forth in claim 2, wherein said fluid passage means extends completely through said tip.

4. The apparatus set forth in claim 2 wherein said port means comprises a pair of ports emerging from said tip substantially at said zone and along lines which diverge in a direction toward said shoulder.

5. A method of trimming an opening at the mouth of an otherwise closed, hollow container, said method comprising introducing into said opening a body; inserting a cutter through the material of said container and cutting around said opening to form a ring; and discharging fluid under pressure through said body from within said container and against said ring in a direction to urge said ring outwardly of said container and longitudinally of said body.

6. Trimming apparatus for cutting a ring from a mouth opening in a container having a radial surface surrounding its mouth comprising: means for supporting the container an axially disposed body means having a mouth entering mandrel at its one end means for relatively axially moving said container and body means to move said mandrel into the mouth opening in the container means for relatively revolving said body means and container; axially offset, generally axially extending cutting means carried by said body means rearwardly of said end and extending axially alongside but radially spaced from said body means; and means carried by said body means operable to create a differential pressure on opposite sides of the material cut out by said cutting means to move the said material axially outwardly of the mouth trimmed.

7. A trimming tool comprising: a rotatable body terminating at one end in a tip; cutting means carried by said body and extending toward said one end thereof; axially extending fluid passage means in said body; and laterally directed fluid port means in said tip in communication with said passage means and emerging from said tip in a direction toward the other end of said body; said rotatable body having a disc portion at one end and a frustoconical tip at its other end; the cutting means being carried by said disc portion and extending axially alongside but radially spaced from said tip.

8. A method of trimming a mouth opening in a plastic container having a radial surface surrounding its mouth comprising: moving a cutter axially into said surface adjacent said mouth opening; cutting through said surface around said opening to sever a generally ring-shaped part; and creating a differential pressure on opposite sides of said part for moving said part axially and discharging said part.

9. Trimming apparatus for cutting a ring from a mouth opening in a container having a radial surface surrounding its mouth comprising: means for supporting the container; an axially disposed body means having a mouth entering mandrel at its one end; means for relatively axially moving said container and body means to move said mandrel into the mouth opening in the container; means for relatively revolving said body means and container; axially offset, generally axially extending cutting means carried by said body means rearwardly of said tip and extending axially alongside but radially spaced from said body means; and means carried by said body means for exerting an axial pressure on the ring cut out, moving it outwardly of the mouth trimmed.

10. A method of trimming the mouth opening molded in a plastic container which has a radial surface surrounding the mouth opening comprising: moving a cutter mandrel axially in one direction into the mouth opening; moving a cutter axially in the same direction into said surface at a location spaced from but adjacent to said mouth opening; cutting through said surface around said opening to sever a generally ring-shaped part; and discharging said part in an axially opposite direction.

References Cited

UNITED STATES PATENTS

| | | | |
|---|---|---|---|
| 1,960,676 | 5/1934 | Kromer | 77—77 |
| 1,997,843 | 4/1935 | Warrell | 83—22 X |
| 2,800,812 | 7/1957 | Mueller et al. | 77—42 X |
| 3,127,636 | 4/1964 | Heider. | |
| 3,230,602 | 1/1966 | Bozek | 83—409 X |

JAMES M. MEISTER, *Primary Examiner.*